US00RE41364E

(19) United States
(12) Reissued Patent
Tsai et al.

(10) Patent Number: US RE41,364 E
(45) Date of Reissued Patent: Jun. 1, 2010

(54) METHOD FOR DETERMINING SCAN LINE MISALIGNMENTS

(76) Inventors: Yu-Fen Tsai, No. 540-6, Sec. 2, Liming Rd., Nantun District, Taichung City 408 (TW); Te-Chih Chang, 3F., No. 27, Yuanqu 1st Rd., Science Industry District, Hsinchu City 300 (TW)

(21) Appl. No.: 11/433,909
(22) Filed: May 11, 2006
(Under 37 CFR 1.47)

Related U.S. Patent Documents

Reissue of:
(64) Patent No.: 6,734,998
Issued: May 11, 2004
Appl. No.: 09/740,898
Filed: Dec. 21, 2000

(30) Foreign Application Priority Data

Feb. 18, 2000 (TW) ..... 89102748

(51) Int. Cl.
*H04N 1/04* (2006.01)

(52) U.S. Cl. ..... 358/488; 358/474; 358/486; 358/494; 358/1.9; 358/406; 358/409; 382/291; 382/287; 250/208.1; 348/241; 348/372

(58) Field of Classification Search ..... 358/474, 358/488, 406, 409, 461, 494, 486, 504, 516, 358/497, 482, 1.9, 513, 514; 382/287, 286, 382/291; 250/208.1; 348/241, 312, 372, 678
See application file for complete search history.

(56) References Cited

U.S. PATENT DOCUMENTS

| | | | | | |
|---|---|---|---|---|---|
| 5,563,403 | A | * | 10/1996 | Bessho et al. | 250/208.1 |
| 5,892,854 | A | * | 4/1999 | de Queiroz et al. | 382/288 |
| 5,978,102 | A | * | 11/1999 | Matsuda | 358/474 |
| 6,134,028 | A | * | 10/2000 | Kim | 358/486 |
| 6,178,015 | B1 | * | 1/2001 | Lee et al. | 358/486 |
| 6,303,921 | B1 | * | 10/2001 | Hastings et al. | 250/208.1 |
| 6,512,585 | B1 | * | 1/2003 | Ikeda | 356/431 |
| 6,534,757 | B2 | * | 3/2003 | Inui et al. | 250/208.1 |
| 2002/0070331 | A1 | * | 6/2002 | Inui et al. | 250/208.1 |
| 2003/0020821 | A1 | * | 1/2003 | Watanabe et al. | 348/312 |

* cited by examiner

*Primary Examiner*—Houshang Safaipour
*Assistant Examiner*—Negussie Worku
(74) *Attorney, Agent, or Firm*—Perkins Coie LLP

(57) ABSTRACT

A test image has a black bias on a white background. The black bias is a line set at about 45 degrees to the scan lines of a scanner. Boundary points of the scanned bias are found. A regression line is calculated from the positions of the boundary points. Differences in the positions of adjacent boundary points, together with the slope reciprocal of the regression line, are used to determine error values. The error values are compared with a gate value to determine if there are any occurrences of scan line misalignment.

22 Claims, 7 Drawing Sheets

METHOD FOR DETERMINING SCAN LINE MISALIGNMENTS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention provides a method for determining if an image from a scanner has occurrences of scan line misalignments. More particularly, a software method enabling a program to determine if an image from a scanner has occurrences of scan line misalignments is disclosed.

2. Description of the Prior Art

Scanners are popular computer peripherals that are used to digitize documents or pictures so that they may be stored on a computer. To ensure a high quality of these scanned images, manufacturers strive to increase the resolution of the images, and to make their colors more brilliant. But a key factor affecting the quality of scanned images is the stability of the scanning module. If the stability of the scanning module is insufficient, the images from a scanner may have misalignments or entire deletions of scan lines in the image.

Please refer to FIG. 1. FIG. 1 is a schematic diagram of a prior art method to determine if there are any occurrences of scan line deletions in an image 10. The test is performed after the scanner has been completely manufactured, and involves the scanning of the test image 10. Testing personnel then analyze the results. As shown in FIG. 1, if a missed scan line 12 is observed by the testing personnel, the scanner is returned to the factory for adjustments. This visual method to determine if a scanner misses scan lines is both time consuming and relatively inaccurate.

Please refer to FIG. 2. FIG. 2 is a schematic diagram of another prior art method that uses a scanned test image 20 to determine if a scanner misses scan lines. The test image 20 is produced by the scanner to be tested by scanning a test picture. Each grid element, such as 24 or 26 in FIG. 2, represents a gray-scale value of a scanned test image pixel from the scanner after scanning the test picture, which has an axis of symmetry at 45 degrees. The range of the gray-scale values are from 0 to 255. The smaller the gray-scale values are, the darker the corresponding image pixels are. The larger the gray-scale values are, the brighter the corresponding image pixels are. The region 28 represents an image region after scanning the test picture, and its pixel values are almost all less than 30.

In this prior art, a search is performed within the scanned test image 20 to find the positions of the boundary points of the test image 20, and then pixel values within the boundary points are tested against diagonally adjacent pixel values. For example, I(X, Y) represents the pixel value of the test image 20 at the Xth column and the Yth line. A simple program is used to compare the pixel value I(i) of a point (X, Y) and the pixel value I(i+1) of another point (X−1, Y+1). If the difference between I(i) and I(i+1) is too large, then it is assumed that a scan line 22 is missing between the lines (Y) and (Y+1).

Hence, the prior art compares two adjacent lines and determines if the scanned test image 20 conforms to the expected 45 degree symmetry of the test picture. The minimum unit required to determine if a scan line has been skipped is one pixel. This is not accurate enough to satisfy the requirements of a high-end scanner.

SUMMARY OF THE INVENTION

It is therefore an objective of the present invention to provide a method for determining scan line misalignments of a scanner.

Briefly, the present invention scans a test image that has a black bias on a white background. The black bias is a line set at about 45 degrees to the scan lines of the scanner. The method involves finding boundary points of the scanned bias, calculating a regression line from the positions of the boundary points, using differences in the position of adjacent boundary points together with the slope reciprocal of the regression line to determine error values, and comparing the error values with a gate value to determine if there are any occurrences of scan line misalignment.

It is an advantage that the present invention can detect scan line misalignments with sub-pixel accuracy, thus fulfilling the more rigid requirements for high-level scanners.

These and other objectives of the present invention will no doubt become obvious to these of ordinary skill in the art after reading the following detailed description of the preferred embodiment, which is illustrated in the various figures and drawings.

DETAILED DESCRIPTION OF THE PREFERRED EMBODIMENT

Figure 1:
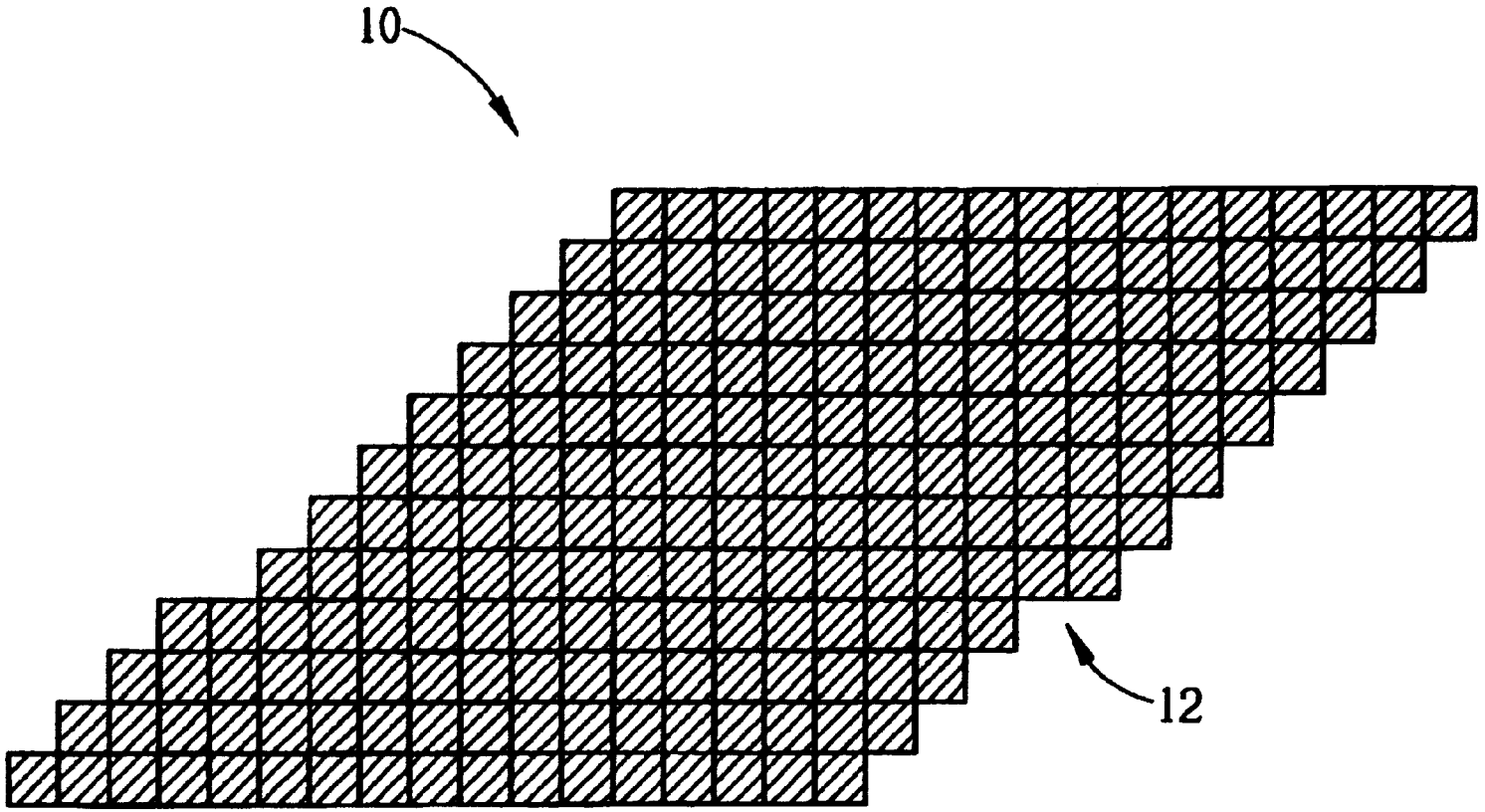
Fig. 1 Prior art
FIG. 1 is a schematic diagram of a first prior art method for determining if an image from a scanner has any occurrences of scan line misalignments.
Figure 2:
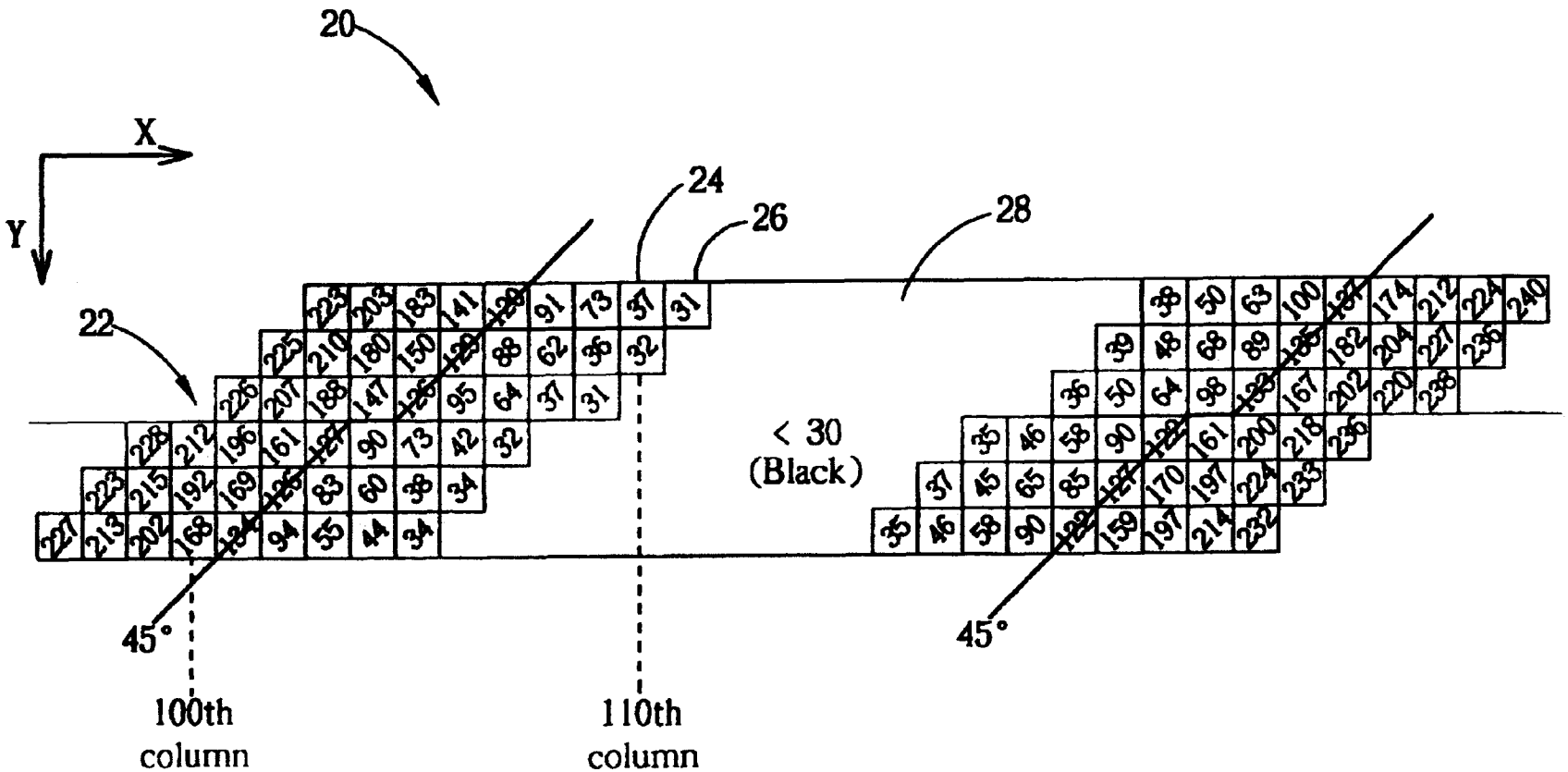
Fig. 2 Prior art
FIG. 2 is a schematic diagram of a second prior art method for determining if an image from a scanner has any occurrences of scan line misalignments.
Figure 3:
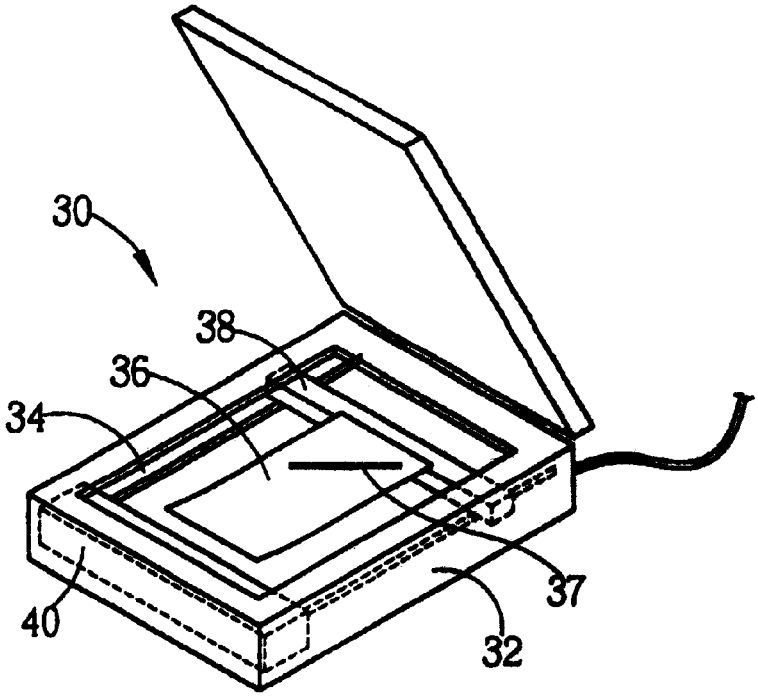
FIG. 3 is a schematic diagram of a scanner with the present invention method.
Figure 4:
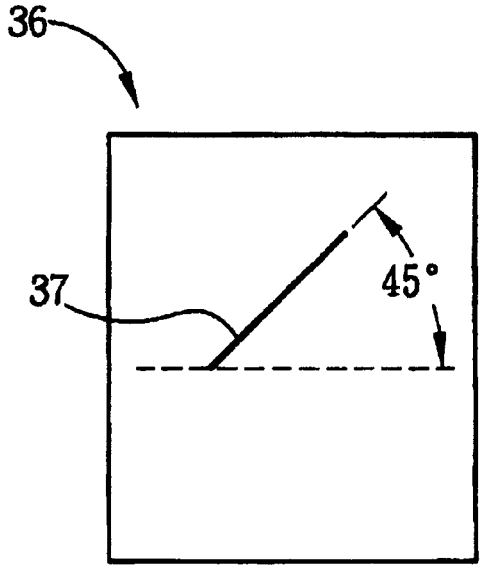
FIG. 4 is a schematic diagram of a document with a test pattern of the present invention method.

Please refer to FIG. 3 and FIG. 4. FIG. 3 is a schematic diagram of a scanner 30 with the present invention method, and FIG. 4 is a schematic diagram of a document 36 for performing the present invention method. The scanner 30 includes a housing 32, a scanning platform 34 onto which is placed the document 36, a scanning module 38 to scan the document 36, and a driving module 40 to drive the scanning module 38. For a preferred embodiment of the present invention, the document 36 has a white background with a test pattern that is a black bias 37. The width of the bias 37 is 2 mm, and it has an angle of 45 degrees with respect to the orientation of the scan lines. The black bias 37 runs from the upper-right portion of the document 46 to the lower-left portion of the document 36.

To determine if there are any occurrences of scan line misalignment, the scanning module 38 is used to scan the document 36. Scan line image information for a plurality of scan lines is collected, each scan line containing a portion of scanned image of the document 36, the scan line information being collected in order. The image information in each scan line includes a plurality of gray-scale pixels, a portion of which correspond to the bias 37.

A searching method is used to find a boundary point of the bias 37 from the gray-scale image information in each scan line. Because the bias 37 on the document 36 includes two boundary lines, the image information in each scan line will have two boundary points. For convenience, the positions of the boundary points of the left boundary line will be described. The positions of the boundary points on the right side of the bias 37 are found in the same manner. This method is actually quite well known in the field of image processing.

Figure 5:
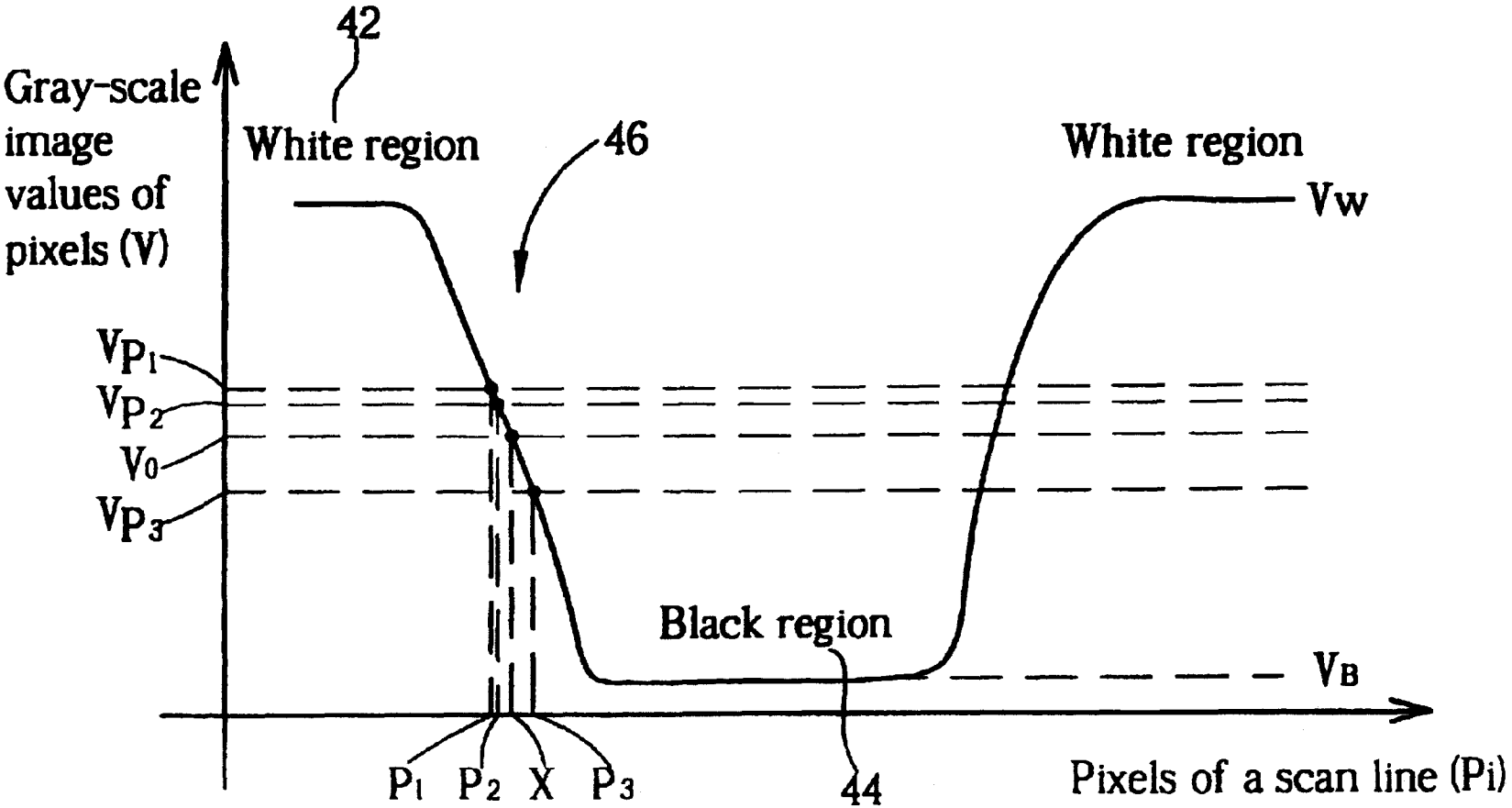
FIG. 5 is a relationship diagram between a plurality of pixels of a scanning line and their corresponding gray-scale image values used to illustrate the present invention method of searching for the boundary points from the image information in a scan line.

Please refer to FIG. 5. FIG. 5 is a relationship diagram between the plurality of pixels of a scan line and their corresponding gray-scale image values, and is used to illustrate the present invention method for searching the boundary points in the image information of a scan line. First, the gray-scale image values of a plurality of pixels in a chosen white region 42 of the scan line is averaged. Half of the value of this result is used to define a boundary reference level ($V_{P1}$). The pixel whose gray-scale image value most closely matches this boundary reference level is selected as a first boundary reference point $P_1$.

Moving forward from the first boundary reference point $P_1$ by a first predetermined number (say, 15) of pixels, a second predetermined number of pixels (again, 15) are selected. Average of the gray-scale values of these chosen pixels are used to define a white reference level ($V_W$). Similarly, by moving backwards from the first boundary reference point $P_1$ by the first predetermined number of pixels (15), another group of the second predetermined number of pixels (15) are selected, and their average values are used as a black reference level ($V_B$).

Because the first boundary reference point $P_1$ is located in an interim region 46 between the white region 42 and the black region 44, moving forward or backward by a predetermined number of pixels from the first boundary point $P_1$ is used to ensure that the chosen pixels are located in the interim region 46. This makes the calculation of the white and the black reference levels more accurate.

The average of the white reference level ($V_W$) and the black reference level ($V_B$) is used to define a boundary level ($V_0$). Two adjacent pixels $P_2$ and $P_3$ are then chosen between where the boundary level $V_0$ falls. That is, the gray-scale image value of the boundary level $V_0$ lies between the gray-scale image values of the pixels $P_2$ and $P_3$, satisfying the inequality $V_{P3} \leqq V_0 \leqq V_{P2}$. These two pixels are used as a second and a third boundary reference points $P_2$ and $P_3$.

Figure 6:
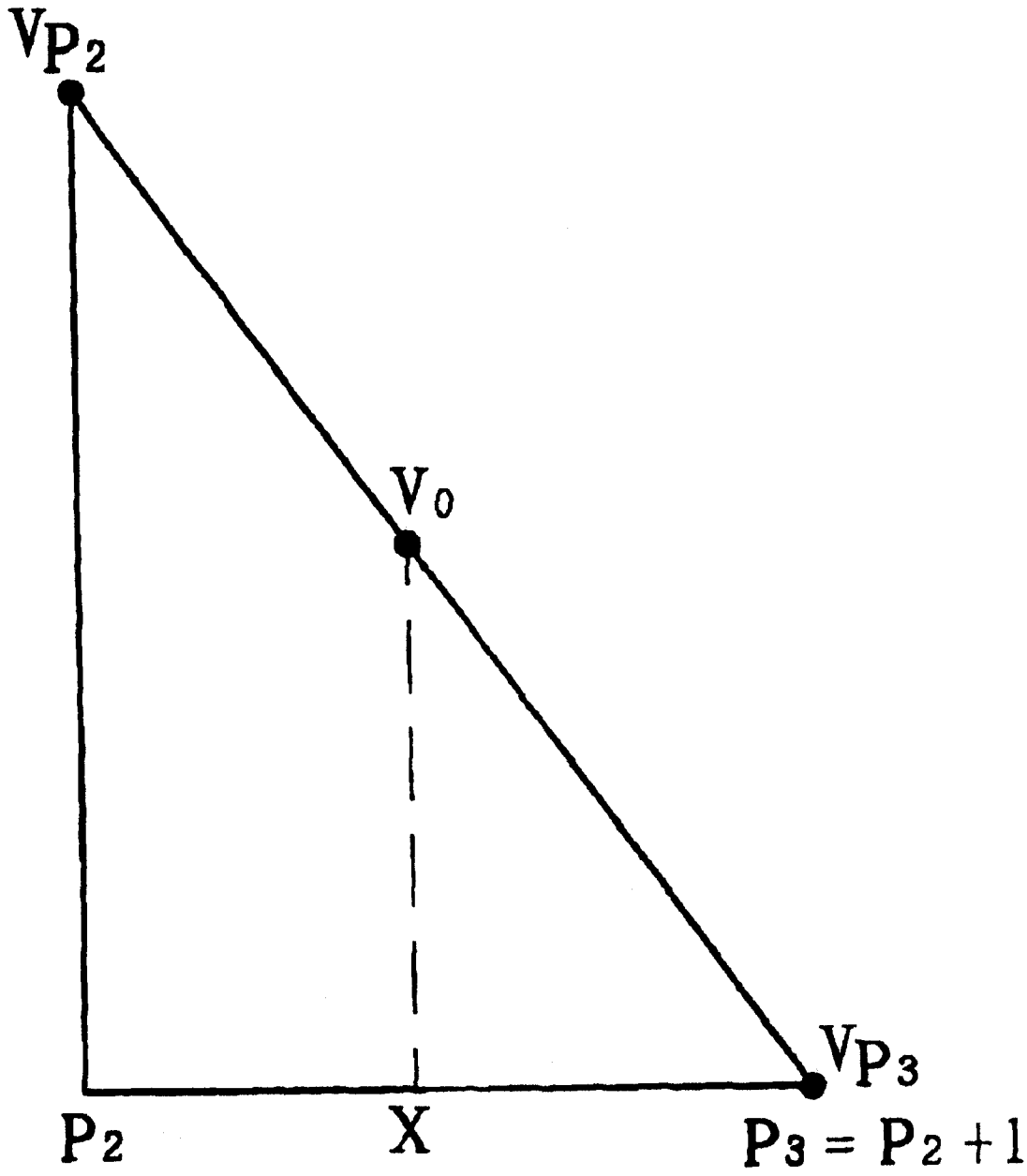
FIG. 6 is a schematic diagram for a method to calculate the boundary points depicted in FIG. 5.

Please refer to FIG. 6. FIG. 6 is a schematic diagram for a method to calculate the boundary points of FIG. 5. The gray-scale image values $V_{P2}$ and $V_{P3}$ of the second and the third boundary reference points are used along with the boundary level $V_0$ to calculate the position X of the boundary point of the scanning line. The following equation is used to calculate X:

$$X = P_2 + \frac{V_{p2} - V_0}{V_{p2} - V_{p1}}.$$

Because $P_2$ and $P_3$ are adjacent pixels, $P_3$ is equal to $P_2+1$. From the equation $$\frac{P_3 - X}{P_3 - P_2} = \frac{V_0 - V_{P2}}{V_{P2} - V_{P3}},$$

the position of the boundary point X is equal to $$\left(P_2 + \frac{V_{p2} - V_0}{V_{p2} - V_{p3}}\right).$$

In the same manner, a series of different positions of boundary points $X_i$ can be calculated, where i is an integer ranging from 1 to n, n being the number of scan lines.

After determining the boundary position points of the left boundary line for every scan line, a regression line and its slope can be calculated. The calculation of the regression line can be done using all, or only some, of the previously found boundary points. Because the calculation and mathematical significance of the regression line is a well known prior art mathematical tool, the equations are only noted here, without undue explanation. With n parts of numbers ($x_i$, $y_i$), i from 1 to n and being a positive integer, chosen to calculate the regression line y=mx+b, the values of m and b can be determined from the following equations:

$$m = \frac{n\sum_{i=1}^{n} x_i y_i - \left(\sum_{i=1}^{n} x_i\right)\left(\sum_{i=1}^{n} y_i\right)}{n\sum_{i=1}^{n} x_i^2 - \left(\sum_{i=1}^{n} x_i\right)^2}$$

$$b = \frac{\left(\sum_{i=1}^{n} y_i\right)\left(\sum_{i=1}^{n} x_i^2\right) - \left(\sum_{i=1}^{n} x_i\right)\left(\sum_{i=1}^{n} x_i y_i\right)}{n\sum_{i=1}^{n} x_i^2 - \left(\sum_{i=1}^{n} x_i\right)^2}$$

After calculating the regression line, the difference in the position of every boundary point is calculated ($\Delta x_i = x_i - x_{i+1}$). This, with the reciprocal of the slope of the regression line (1/m), is used to calculate corresponding error values as ($ERR_i = |\Delta x_i - 1/m|$). And the error values can also be interpreted with the use of error ratios, which are equal to $ERR_i$/(1/m).

Finally, each error value $ERR_i$ is compared against a predetermined gate value (TD) to determine if the image from the scanner has any occurrences of scan line misalignment. If a specific error value is larger than the gate value, then there must be a scan line misalignment at the corresponding scan line. If the specific error value is less than or equal to the gate value, then there is no occurrence of scan line misalignment at that scan line. Occurrences of scan line misalignment are therefore determined by the choice of the gate value, which must be set by experienced personnel. In the preferred embodiment of the present invention, the gate value is about 0.3.

Figure 7:
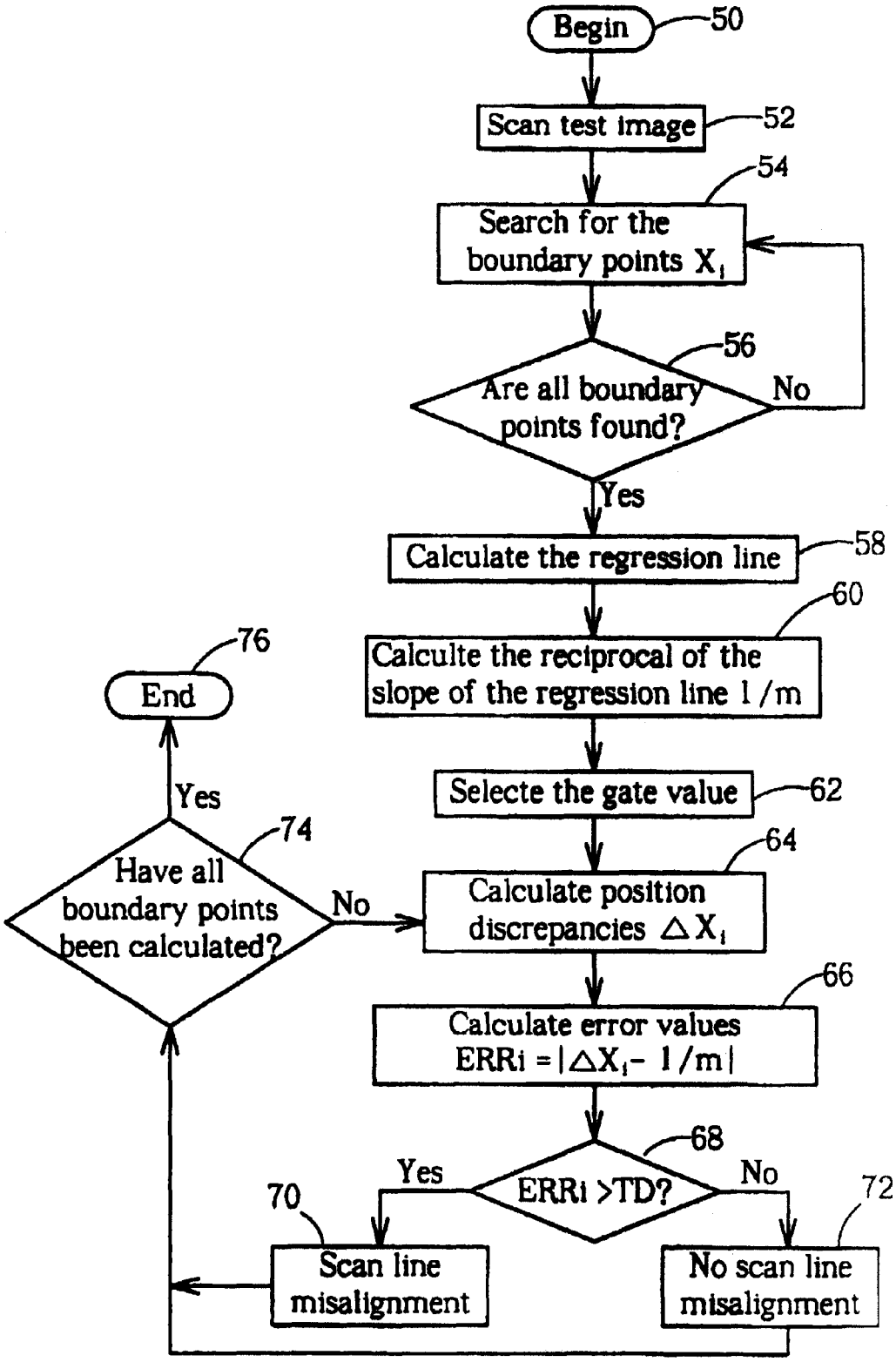
FIG. 7 is a flow chart of the present invention method for determining if an image from a scanner has any occurrences of scan line misalignments.

Please refer to FIG. 7. FIG. 7 is a flow chart of the present invention method to determine if an image from a scanner has any occurrences of scan line misalignment. The method of the present invent includes the following steps:

Step 50: Begin.

Step 52: Scan the black bias 37 on the document 36, and then collect the corresponding image information from the scan lines.

Step 54: Search for the position of the black bias 37 from the image information in the scan lines by way of searching for the boundary points.

Step 56: Are the required positions of the boundary points found? If not, go back to Step 54.

Step 58: Calculate the corresponding regression line using the found positions of the boundary points.

Step 60: Calculate the reciprocal of the slope of the regression line (1/m).

Step 62: Select an appropriate gate value (TD).

Step 64: Calculate the differences in the positions of the boundary points ($\Delta x_i = x_i - x_{i+1}$) of the adjacent scan lines.

Step 66: Use the differences of step 64 and the reciprocal of the slope of the regression line of step 60 to calculate corresponding error values ($ERR_i = |\Delta x_i - 1/m|$), and the error values can also be interpreted with the use of error ratios, which are equal to $ERR_i/(1/m)$.

Step 68: Is an error value from step 66 larger than the chosen gate value? If not, go to step 72, otherwise go to Step 70.

Step 70: A scan line misalignment has occurred. Go to step 74.

Step 72: There are no occurrences of scan line misalignment.

Step 74: Have all of the chosen boundary points been calculated? If not, go to step 64, otherwise go to Step 76.

Step 76: End.

Figure 8:
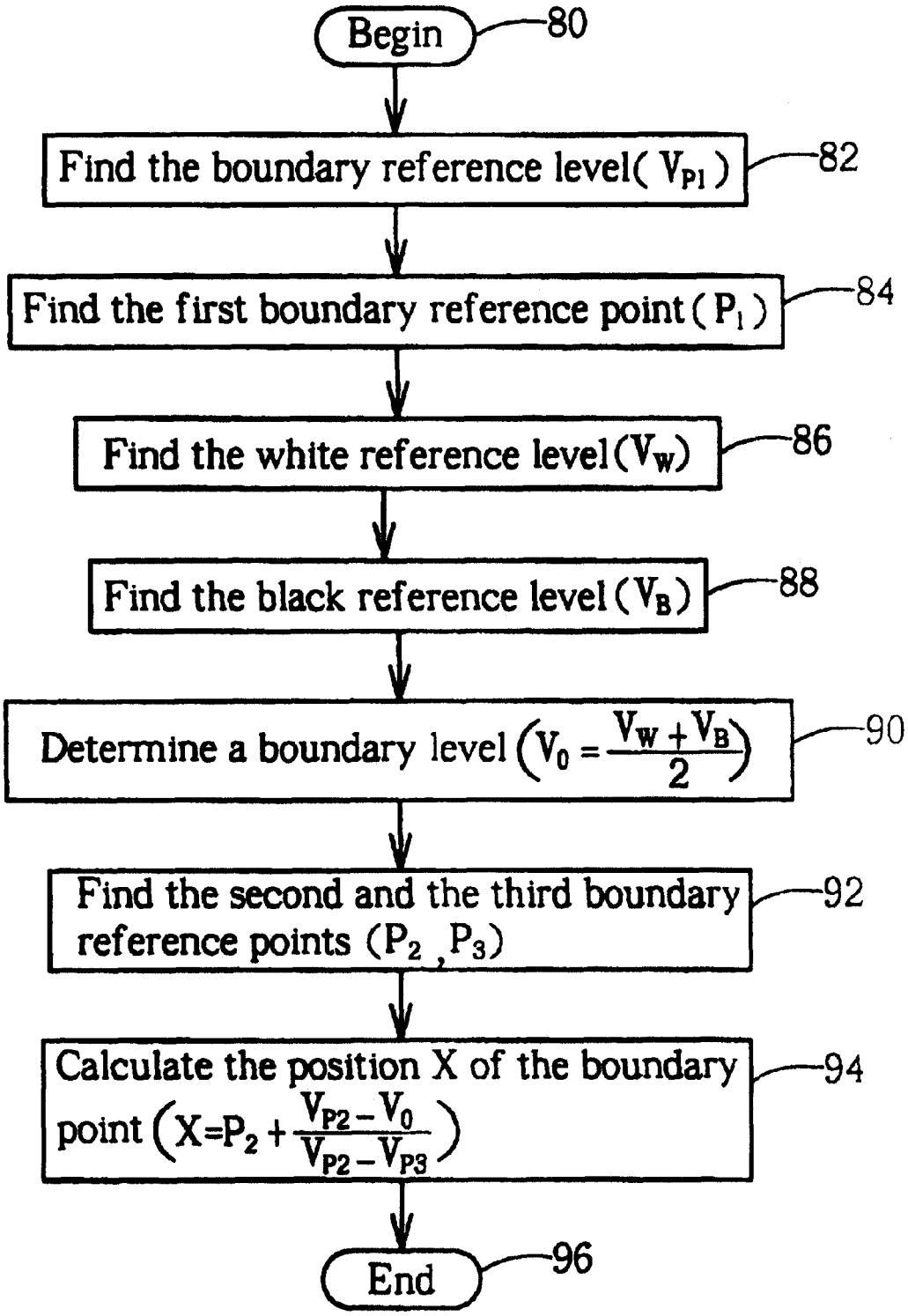
FIG. 8 is a flow chart of the present invention method to search for boundary points from the image information in a scan line.

Please refer to FIG. 8. FIG. 8 is a flow chart of the present invention method of searching for the boundary points in the image information of a scan line. This method includes the following steps:

Step 80: Begin.

Step 82: Average the gray-scale image values of the pixels in the white region and defining half of this average value as a boundary reference level $V_{P1}$.

Step 84: Find the pixel in the scan line with a gray-scale value that is closest to the boundary reference level, and define this pixel as a first boundary reference point $P_1$.

Step 86: After moving forward 15 pixels from the first boundary reference point, select the next 15 pixels ahead, and average the gray-scale image values of these 15 pixels to determine a white reference level $V_W$.

Step 88: After moving backward 15 pixels from the first boundary reference point, select the next 15 pixels behind and average the gray-scale image values of these 15 pixels to determine a black reference level $V_B$.

Step 90: Average the white reference level $V_W$ and the black reference level $V_B$ to determine a boundary level $$V_0 = \frac{V_B + V_W}{2}.$$

Step 92: Search for two adjacent pixels $P_2$ and $P_3$ between where $V_0$ falls, so that $V_{P3} \leqq V_0 \leqq V_{P2}$, and define these two pixels as the second and the third boundary reference points $P_2$ and $P_3$.

Step 94: Calculate the position of the boundary point X, using the equation $$X = P_2 + \frac{V_{p2} - V_0}{V_{p2} - V_{p3}}.$$

Step 96: End.

In the first prior art method, a manual, visual inspection of a scanned test image is performed, which is both judgmental (as it depends on the individual experience of the testing staff) and time-consuming. In the second prior art, the comparison of gray-scale image values of two adjacent scan lines to determine if the slope of the scanned test image is equal to its original value lowers the factors of personal judgement, but the results are too rough to fulfill the requirements of high-level scanners. The present invention method, however, searches for the boundary points to determine a regression line, and can calculate the positions of the boundary points accurately within one pixel unit and the error values of all boundary points to the regression line. If the error value is larger than a predetermined gate value, a scan line misalignment is determined to have occurred. In light of the discussion above, this method fulfills the requirements of high-level scanners, and the gate value can be chosen by experienced personnel to account for different requirements.

Those skilled in the art will readily observe that numerous modifications and alternations of the device may be made while retaining the teachings of the invention. Accordingly, the above disclosure should be construed as limited only by the metes and bounds of the appended claims.

What is claimed is:

1. A method for determining if an image from a scanner has an occurrence of scan line misalignment, the scanner comprising a housing, a scanning platform upon which is placed a document to be scanned, a scanning module to scan the document, and a driving module to drive the scanning module, the method comprising:

scanning a document having a test image and collecting corresponding scan line image information from a plurality of scan lines in order, each scan line image having a portion of the scanned image of the test image;

using a method of searching for a predetermined boundary point to find the position of a boundary point of the test image from the information in every scan line image;

calculating a regression line from the position of the boundary point;

calculating discrepancies of corresponding positions of boundary points and the slope reciprocal of the regression line from the image information of adjacent scan lines and determining corresponding error values from every discrepancy and slope reciprocal; and comparing every error value with a predetermined gate value to determine if the scan line images from the scanner have any occurrences of scan line misalignment.

2. The method of claim 1 wherein the method uses all found positions of the boundary points to calculate the regression line.

3. The method of claim 1 wherein the method uses a portion of the found positions of the boundary points to calculate the regression line.

4. The method of claim 1 wherein the regression line y=mx+b is calculate*d* by $$m = \frac{\sum_{i=1}^{n} x_i y_i - \left(\sum_{i=1}^{n} x_i\right)\left(\sum_{i=1}^{n} y_i\right)}{n\sum_{i=1}^{n} x_i^2 - \left(\sum_{i=1}^{n} x_i\right)^2}, \quad b = \frac{\left(\sum_{i=1}^{n} y_i\right)\left(\sum_{i=1}^{n} x_i^2\right) - \left(\sum_{i=1}^{n} x_i\right)\left(\sum_{i=1}^{n} x_i y_i\right)}{n\sum_{i=1}^{n} x_i^2 - \left(\sum_{i=1}^{n} x_i\right)^2}$$

[and] *wherein* $(x_i, y_i)$ are the positions of the boundary points chosen to calculate the regression line.

5. The method of claim 1 wherein the document has a white background, and the test pattern is a black bias from an upper-right position to a lower-left position, each scan line comprising gray-scale image information from a plurality of pixels, and the method of searching for a predetermined boundary point proceeds from up to down and from left to right to search for the boundary points of the bias from the gray-scale image information in each scan line.

6. The method of claim 5 wherein the method of searching for a predetermined boundary point [has the following steps] *comprises*:

averaging the gray-scale values of a plurality of pixels in a chosen white region of a scan line, half of the averaging result being a boundary reference level ($V_{P1}$), and defining the gray-scale value of a pixel closest to the boundary referencing level as a first boundary reference point ($P_1$);

moving forward a first predetermined number of pixels from the first boundary reference point to select a second predetermined number of pixels, *the* average of the gray-scale values of the second predetermined number of pixels being a white reference level ($V_W$);

moving backward the first predetermined number of pixels from the first boundary reference point to select the second predetermined number of pixels, *the* average of the gray-scale values of the second predetermined number of pixels being a black reference level ($V_B$);

averaging the white and the black reference levels to determine a boundary level ($V_0$);

searching for two adjacent pixels ($P_2$, $P_3$) from the plurality of pixels of the scan lines where the boundary level between both gray-scale values of the two adjacent pixels satisfies ($V_{P2} \leqq V_0 \leqq V_{P2}$), and setting these two pixels as a second and a third boundary reference point ($P_2$, $P_3$); and using the gray-scale values of the second and the third reference points ($V_{P2}$, $V_{P3}$) and the boundary level ($V_0$) to calculate the boundary point (X) mathematically by $$x = P_2 + \frac{V_{p2} - V_0}{V_{p2} - V_{p3}}.$$

7. The method of claim 6 wherein the first and the second predetermined numbers are both 15.

8. The method of claim 1 wherein the width of the black bias is 2 mm, and the black bias has an angle of about 45 degrees with respect to the scan lines.

9. The method of claim 1 wherein the predetermined gate value is 0.3.

*10. A method for identifying scan line misalignment in a scanner, comprising:*

*scanning a test image to obtain scanned image data corresponding to a plurality of scan lines of the scanner;*

*locating one or more boundary points of the scanned test image corresponding to at least a portion of the plurality of scan lines;*

*determining a regression line for at least a portion of the one or more boundary points;*

*determining a corresponding error value for at least a portion of the one or more boundary points, based at least in part on the regression line;*

*comparing one or more corresponding error values with a gate value; and*

*determining whether the scanner has a scan line misalignment based at least in part on the comparing.*

*11. The method of claim 10, wherein locating one or more boundary points further comprises:*

*for a particular scan line, identifying a first boundary reference point $V_P$;*

*determining a white reference level $V_W$;*

*determining a black reference level $V_B$;*

*averaging the white and the black reference levels to determine a boundary level $V_0$;*

*selecting two pixels as a second and a third boundary reference point $P_2$ and $P_3$ that satisfy the relationship $V_{P3} \leqq V_0 \leqq V_{P2}$, wherein $V_{P2}$ and $V_{P3}$ comprise second and third boundary reference points; and*

*calculating a boundary point (x) mathematically by*

$$x = P_2 + \frac{V_{p2} - V_0}{V_{p2} - V_{p3}}.$$

*12. The method of claim 10, wherein determining a corresponding error value includes:*

*determining a difference in position between a boundary point corresponding with a first scan line and a boundary point corresponding with a second scan line;*

*determining a reciprocal of the slope of the regression line at the first scan line; and*

*determining an error value corresponding with the first scan line based at least in part on the difference between the determined difference in position between the boundary point corresponding with the first scan line and the boundary point corresponding with the second scan line and the determined reciprocal of the slope of the regression line at the first scan line.*

*13. The method of claim 12, wherein the first and second scan lines comprise adjacent scan lines.*

*14. The method of claim 10, wherein the gate value comprises a predetermined value.*

*15. The method of claim 10, wherein the gate value is determined based on properties of the scanner.*

*16. The method of claim 10, wherein determining whether the scanner has a scan line misalignment includes identifying a misalignment if the error value is numerically greater than the gate value.*

*17. A scanner having a plurality of scan lines, the scanner comprising:*

*a housing;*

*a scanning platform positioned at least partially in the housing;*

*a scanning module positioned at least partially in the housing and configured to obtain a scanned image of the document; and*

*a driving module positioned at least partially in the housing and configured to drive the scanning module to scan a document positioned on the scanning platform, wherein the scanner is configured to—locate one or more boundary points of the scanned image;*

*determine a regression line for at least a portion of the one or more boundary points;*

*determine corresponding error values for the one or more boundary points, based at least in part on the regression line; and*

*compare one or more corresponding error values with a gate value.*

*18. The scanner of claim 17, wherein said driving module is further configured to identify a misalignment if the error value is numerically greater than the gate value.*

*19. The scanner of claim 17, wherein said document comprises an image of a test pattern.*

*20. The scanner of claim 19, wherein said image of a test pattern comprises a black bias that runs from the upper-right portion of the document to the lower-left portion of the document.*

*21. The scanner of claim 17, wherein said scanner is further configured to:*

*identify a first boundary reference point $V_P$ for a particular scan line;*

*determine a white reference level $V_W$;*

*determine a black reference level $V_B$;*

*average the white and the black reference levels to determine a boundary level $V_0$;*

*select two pixels as a second and a third boundary reference point $P_2$, and $P_3$ that satisfy the relationship $V_{P3} \leqq V_0 \leqq V_{P2}$, wherein $V_{P2}$ and $V_{P3}$ comprise second and third boundary reference points; and*

*calculate a boundary point (x) mathematically by*

$$x = P_2 + \frac{V_{p2} - V_0}{V_{p2} - V_{p3}}.$$

*22. The scanner of claim 17, wherein said scanner is further configured to:*

*determine a difference in position between a boundary point corresponding with a first scan line and a boundary point corresponding with a second scan line;*

*determine a reciprocal of the slope of the regression line at the first scan line; and*

*determine an error value corresponding with the first scan line based at least in part on the difference between the determined difference in position between the boundary point corresponding with the first scan line and the boundary point corresponding with the second scan line and the determined reciprocal of the slope of the regression line at the first scan line.*

* * * * *